Dec. 18, 1923.
B. F. SEYMOUR
RESILIENT BEARING
Filed June 7, 1919
1,477,907
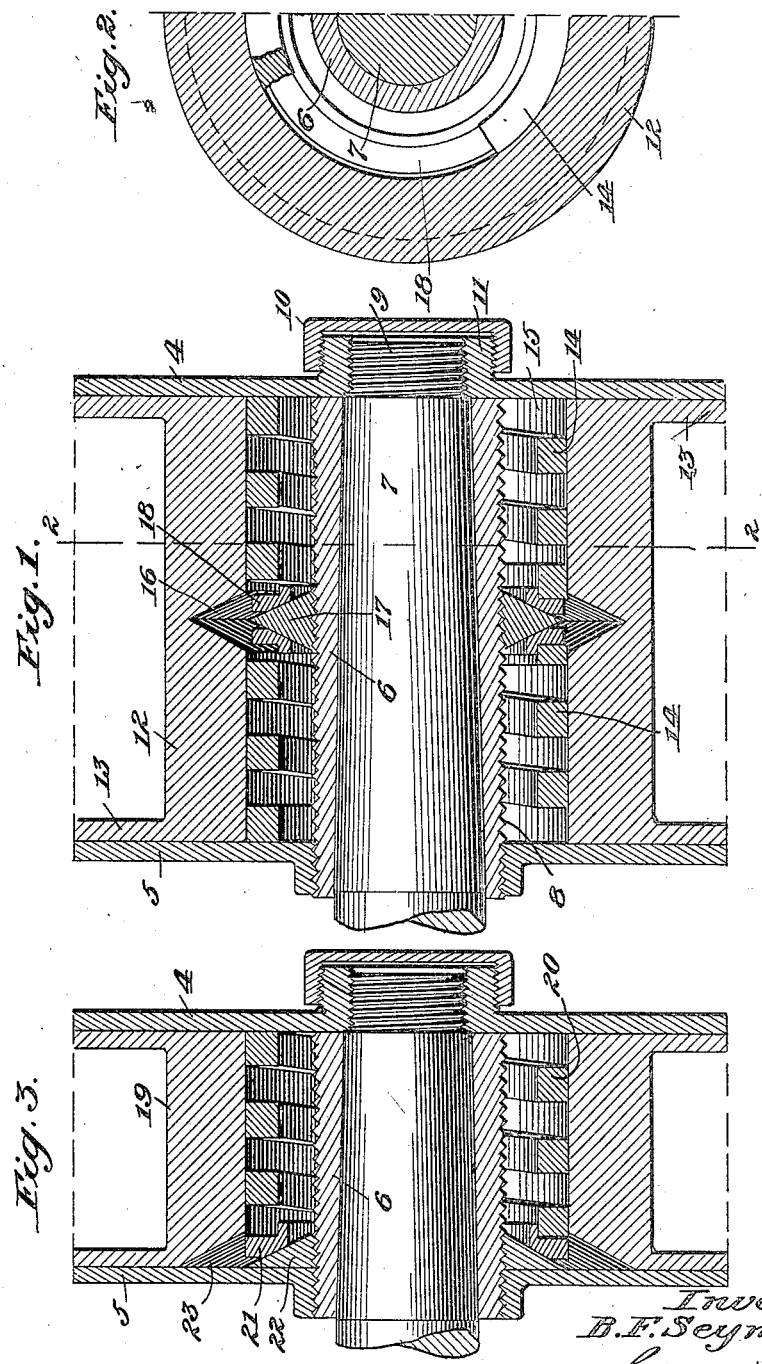
Inventor:
B. F. Seymour.

Patented Dec. 18, 1923.

1,477,907

UNITED STATES PATENT OFFICE.

BENJAMIN F. SEYMOUR, OF WASHINGTON, DISTRICT OF COLUMBIA.

RESILIENT BEARING.

Application filed June 7, 1919. Serial No. 302,412.

*To all whom it may concern:*

Be it known that I, BENJAMIN F. SEYMOUR, a citizen of the United States, residing at Washington, in the District of Columbia, have invented certain new and useful Improvements in Resilient Bearings; and I do hereby declare the following to be a full, clear, and exact description of the invention, such as will enable others skilled in the art to which it appertains to make and use the same.

The present invention relates to resilient bearings, more particularly such bearings for vehicle wheels, and consists in the combinations and arrangements of elements hereinafter disclosed and particularly set forth in the accompanying claims.

The purpose of the invention is to provide a wheel having means associated with the hub thereof which serves both as the resilient medium and shock absorber for the vehicle, and wherein all motions incident thereto are transmitted axially of the wheel to the end of obtaining substantially complete flexibility with maximum rigidity of wheel structure.

Although the application of the invention is shown herein for vehicle wheels it will be evident that the same will serve equally as well as a resilient bearing wherever such equipment is desired, and it is intended that the invention be considered as a resilient bearing generally and not specifically limited to a wheel.

The device is shown by way of illustration in the accompanying drawing wherein—

Figure 1 is a transverse sectional view of the device as applied to a wheel hub, Figure 2, a sectional view taken on the line 2—2 of Figure 1, and Figure 3 is a view similar to Figure 1 and showing a modified construction.

Referring to the construction in further detail and wherein like reference characters designate corresponding parts, the device consists of a casing comprising sections or side plates 4 and 5 and a thimble 6 that is fitted on the axle 7 and said thimble has exterior screw threads 8 for its entire length and on which threads the plate 5 is adapted to be secured as shown. The plate 4 screws on the threaded portion 9 of the axle 7 and a cap 10 screws on the threaded hub 11 of said plate, as shown.

The portion 12 is the inner rim of the wheel and said rim is adapted to carry the spokes, the outer rim, and tire, as will be understood. Said rim portion 12 has a pair of annular flanges 13 at the sides thereof which bear in close contact against the inner surfaces of the side members 4 and 5 and in this relation said hub portion and the wheel rim are adapted to have limited radial movement.

The floating suspension, or support for the wheel, consists of a pair of spiral springs 14 that fit closely within the annular chamber 15 provided between the thimble 6 and rim portion 12, and said springs have their several convolutions in immediate contact with the inner cylindrical surface of said rim portion 12, as shown.

Through the medium of the supporting springs 14 the said wheel rim is permitted to have limited radial movement incident to the uneven surface of the roadway, and to avoid hindrance of this radial movement said rim portion 12 is cut away, as at 16, to receive the cone ring 17 whose surfaces form the bearing elements for the pair of spring compressing rings 18 and against which members the inner ends of said springs 14 bear, as shown. The outer or stationary ends of said springs bear against the hub members 4 and 5 and simply lie in contact therewith; i. e., no fastening means are employed.

In the construction shown in Figure 3 the arrangement is in all respects similar to that disclosed in Figures 1 and 2 except that in this instance the inner rim portion 19 is supported by a single spiral spring 20 in lieu of a pair of such springs as in the former instance.

The supporting spring 20 also carries a compressing ring 21 that seats against the cone member 22 which is screw-threaded on the thimble 6, and said member 22 is located immediately adjacent the inner surface of the hub member 5. To permit of free movement for the wheel rim said rim is angularly cut away on one side as at 23.

It will therefore be seen from the foregoing that any shock due to obstacles encountered by the wheel rim or from other effect will cause the inner rim portion to move inwardly and this movement will be taken up and the shock thereof absorbed through the contraction of the resilient element. This contraction is then transmitted in a direction at right-angles to the force applied; i. e., along the axis of the wheel. The cut away portion in the wheel rim affords the needed clearance and on the expansion of the springs the several parts are restored to normal.

It will be obvious of course that different forms of construction may be provided in lieu of that disclosed and described herein. And while I have shown and described certain apparatus for accomplishing the result initially stated it is to be understood that I am not limited to the precise details shown but may on the other hand adopt such modifications or changes within the scope of the claims to better suit the end in view.

I claim—

1. In a resilient bearing, the combination of a journalled supporting member, a member movable radially thereon, a laterally compressible element interposed between said members engaging with and directly supporting said radially movable member, and a cone element fixedly mounted on the supporting member operable to compress said compressible element and absorb shocks imparted to said radially movable member, substantially as set forth.

2. In a resilient wheel, the combination of a shaft, a hub journalled on said shaft, a rim having limited radial movement on the hub, a resilient element interposed between said hub and rim, said resilient element surrounding the hub and directly supporting the wheel rim a cone fixedly mounted on the hub and adapted to laterally compress said resilient element and thereby absorb shocks imparted to the wheel rim, substantially as set forth.

3. In a resilient bearing, the combination of a shaft, a wheel hub journalled thereon, a wheel rim having limited radial movement on the hub, a pair of oppositely acting springs interposed between said wheel hub and rim portions, said springs surrounding the hub and directly supporting the wheel rim and cone elements fixedly mounted on said hub co-operable with said springs to laterally compress the same and absorb shocks imparted to the wheel rim, substantially as set forth.

4. In a resilient bearing, the combination of a shaft, a wheel hub journalled on the shaft, a wheel rim radially movable on the hub, a pair of springs interposed between the wheel rim and hub, said springs surrounding the hub and directly supporting the wheel rim and cone elements fixedly mounted on the hub operable to laterally compress said springs and absorb shocks imparted to the wheel rim, substantially as set forth.

5. In a resilient vehicle wheel the combination of a hub member, a wheel rim movable radially thereon, a pair of spiral springs interposed between said hub and the wheel rim, said springs surrounding the hub, compression rings for said springs, and cone elements fixedly mounted on said hub intermediate said compression rings and co-operable therewith to absorb shocks imparted to the wheel rim, substantially as set forth.

In testimony whereof I affix my signature.

BENJAMIN F. SEYMOUR.